Jan. 6, 1925.                                             1,521,969
                      G. E. ROBINSON
                       WATER METER
                     Filed Feb. 5, 1924

INVENTOR
Geo. E. Robinson
BY Denison & Thompson
      ATTORNEYS

WITNESS
H. W. Hurst.

Patented Jan. 6, 1925.

1,521,969

UNITED STATES PATENT OFFICE.

GEORGE E. ROBINSON, OF CANASTOTA, NEW YORK.

WATER METER.

Application filed February 5, 1924. Serial No. 690,731.

*To all whom it may concern:*

Be it known that I, GEORGE E. ROBINSON, a citizen of the United States of America, of Canastota, in the county of Madison, in the State of New York, have invented new and useful Improvements in Water Meters, of which the following, taken in connection with the accompanying drawings, is a full, clear, and exact description.

This invention relates to water meters of the oscillating disc type in which the unit spindle of the registering device is normally driven through the medium of intermeshing spur gears from a parallel spindle which is coaxial with the center of oscillation of the disc and is driven thereby through the medium of a gear train.

These meters are used extensively in various industrial plants, public buildings, and private residences and are highly efficient in registering the normal flow of water in all of those water distributing systems, but in case any of the water mains should be drained either by bursting or for repairs or flushing, the opening of any faucet or other air inlet in the metered system would not only allow the back flow of any negligible quantity of water which may be confined in the system at this time but would also allow the more serious back flow of air through the meter which as commonly employed would cause a backward movement of the meter and resultant reduction in the reading by subtraction.

These air inlets in the metered system may result from:

1. Open connections to the feed water tanks controlled by float valves.
2. Automatic sprinklers used in public toilets.
3. Automatic drinking fountains.
4. Open pipe lines used for spraying systems.
5. Operation of flush valves for toilets.
6. Action of pressure tanks on straight away lines which develop even pressure with the city lines.
7. Action of dry fire lines in factories where pipes are filled with compressed air under sufficient pressure to automatically hold back the water.

All or any of these conditions might exist in the metered piping system of any consumer at the time of or during the leakage or drainage of a water main which might continue for hours at a time.

It is therefore, evident, that if the operation of the meter including the registering device is reversed by the back-flow of air for any considerable period of time, it would result in a more rapid reduction of the meter-reading than would be caused by the back flow of water from the metered system for the same period by reason of the rapid movement of the back flowing air being proportionate to the volume of waste through the main and to the capacity of the air inlet in said system.

That is, the reading at the end of the period might be several thousands of cubic feet less than that of the beginning of the back flow of air through the meter so that when the water pressure is restored in the metered system, a sufficient quantity of water substantially equal to the registered loss by back-flow of air would have to be resupplied through the meter to bring the latter to its former registration.

Under these conditions, the water department would be giving practically the entire loss to the consumer without charge which would, of course, be unjust to the department.

Furthermore, in meters of this type, the oscillating disk must be free to operate under a minimum fluid pressure and at relatively high speed as compared with that of the unit hand of the counter and therefore, the inertia or resistance of the registering device is proportionately high and constitutes what may be termed "peak load" of the meter.

For example, in a 5/8 inch meter, the cyclic movements of the disc is about 235 for each cubic foot of water passing through the meter as compared with $\frac{1}{10}$ of a revolution of the unit spindle of the counter, and it therefore, follows that any sudden backflow of water or air caused by quick closing fixtures, defective pumps or faucets or by increased back pressure from steam boilers or dry fire system, produces excessive strain upon the driving connections to the register which frequently results in breaking the disc, distorting the casing or separating the driving gears for the registering device.

The main object, therefore, of my present invention is to provide a simple and efficient one-way drive connection between the parallel driving and driven spindles wholly within the register case whereby the backflow of air through the meter will not affect the registering device in that it will remain at the same reading at the end of a predetermined period of backflow as it would at the beginning thereby establishing a meter reading which is equitable to both the consumer and to the department, and at the same time to avoid the injurious results previously mentioned.

One of the specific objects is to enable any of the standard disk meters of this type to be easily and quickly equipped with my improved one-way drive connection without in any way altering the speed ratio between the driving and driven elements or in other words, by simply providing one of the spur gears with a one-way clutch drive connection with its spindle.

In other words, I have sought to utilize the same mechanism as formerly used except to loosen the spur gear on its spindle and to provide it with a one-way drive clutch face cooperating with a companion clutch member on the spindle whereby the normal operation of the meter will impart correct movement to the registering device while a reverse movement of the meter will automatically release the registering device from its means.

Other objects and uses relating to specific parts of the clutch will be brought out in the following description.

In the drawings:—

Figure 1:
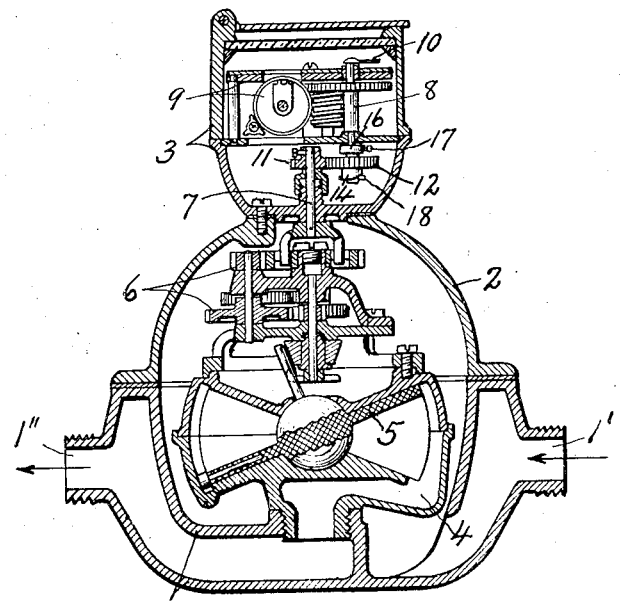
Figure 1 is a longitudinal vertical sectional view of a disc meter and my improved clutch drive for the registering device.
Figure 2:
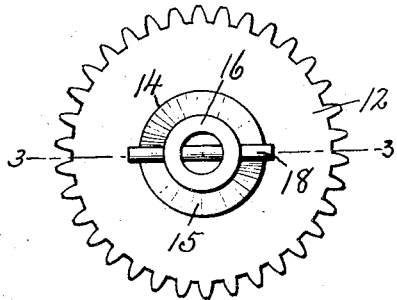
Figure 2 is an enlarged inverted plan of the clutch and gear with which it is associated.
Figure 3:
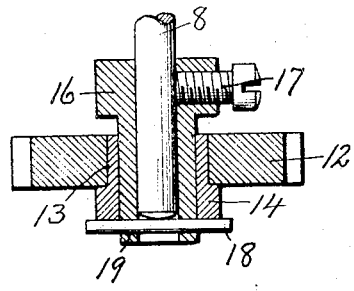
Figure 3 is a sectional view taken on line 3—3, Figure 2.
Figure 5:
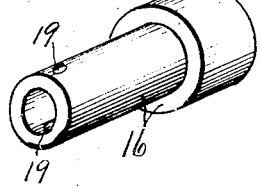
Figure 5 is a perspective view of the guide sleeve upon which the clutch sleeve shown in Figure 4 is slidably mounted.
Figure 4:
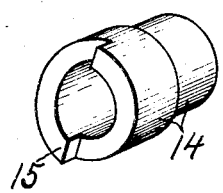
Figure 4 is a perspective view of the detached clutch sleeve upon which the gear shown in Figures 2 and 3 is mounted.

As illustrated, the meter comprises an impeller case —1—, a gear case —2— and a register case —3— all of which parts are secured together end to end in vertical coaxial relation, the impeller case —1— being provided with the usual inlet and outlet passages —1'— and —1"—, impeller chamber —4— and impeller disc —5—.

The gear case —2— contains a speed reducing gear train —6— for transmitting rotary motion from the oscillating disk —5— to a vertical drive shaft —7— which is journaled in the bottom of the register case —3—, coaxial with the center of oscillation of the disc —5— and serves as the direct driving means for the unit spindle —8— of the counter mechanism —9— which is also mounted within the register case —3—, the unit spindle —8— being provided with a hand —10— movable around a suitable dial to indicate at each revolution one cubic foot of water passing through the meter.

The parts thus far described are the usual standard construction except as to the driving connections between the spindles —7— and —8—, said connections consisting in this instance, of a pair of spur gears —11— and —12—, the gear —11— being of the usual construction and secured in the usual manner to the driving shaft —7—.

The gear —12— may also be of the usual construction except that it is provided with a central bore —13— in which is tightly fitted a hub —14— having its lower end provided with a one-way drive clutch face —15—.

A sleeve —16— is secured by a set screw —17— to the lower end of the unit hand spindle —8— of the counter and extends loosely through the central opening in the hub —14— and is provided with a clutch pin —18— extending diametrically therethrough for cooperative engagement with the clutch face —15— of the hub —14— whereby motion will be transmitted from the gear —12— to the spindle —8— for operating the counter mechanism during the normal flow of the water through the meter, but will automatically release the driving gear —12— from driving connection with the spindle —8— to prevent the operation of the counter mechanism when the direction of flow of the water or air through the meter is reversed.

That is, the clutch members —15— and —18— constitute a one-way drive connection between the gear —12— and unit spindle —8— adapted to operate said spindle during the normal flow of water through the meter and to prevent its operation in case of the back flow of water or air through the meter.

It is now evident that in order to apply applicant's invention to this type of meter, it is only necessary to remove the gear —12— commonly employed and tightly fit into the central opening thereof, the clutch hub —14— and then to secure the guide sleeve —16— to the lower end of the shaft —8— after which the gear —12— with the clutch hub —14— thereon, may be replaced into mesh with the usual gear —11— and held in place by the insertion of the clutch pin —18— which is passed through registering openings —19— in the lower end of the sleeve —16— so that its ends may cooperate with the clutch face —18— of the hub —14—.

The gear —12— with its clutch member —14— is loosely mounted upon the sleeve —16— for relative rotary and axial movement so that in case of backflow of water or air through the meter, the gear —12— may be free to rotate in a reverse direction independently of the spindle —8— and therefore, independently of the counter mechanism.

This direct one-way drive connection between the disc-operated gear train and counter mechanism takes the initial strains of the "peak load" in the normal operation of the meter which is generally steady or progressively variable, but in case of sudden reversal of the flow of water or air through the meter, the ability of said connection to release the counter mechanism from reverse action relieves that connection as well as its driving parts including the oscillating disk from the "peak load" and thereby avoid breakages and other impairments of the driving elements and housing, therefore, in addition to its main function of preventing reverse action of the counter and incidental subtraction of the reading by the backward flow of the air through the meter, all of which contributes the permanency and reliability of the meter and establishes a more equitable basis for water actually fed through the meter.

These advantages are due not only to the direct one-way drive connection between the speed-reducing train and counter mechanism, but also to the location of the one-way drive connection within the housing for the counter mechanism and close juxtaposition to the latter so as to relieve the main driving mechanism free from hydraulic shocks due to certain conditions of operations previously mentioned.

Furthermore, this device is rendered particularly simple and efficient by reason of the vertical parallel arrangement of the driving and driven shafts —7— and —8— which permits the axially movable gear —12— with its clutch member —14— to automatically restore itself to its driving position by its own weight in case it should be suddenly displaced from such driving position by abrupt reversals of movement of the driving mechanism.

What I claim is:

A water meter of the oscillating disc type having a counter mechanism provided with a vertical unit-measure indicating spindle, a gear movable axially and angularly relatively to said spindle, one-way drive connections between said gear and spindle, and means for transmitting rotary motion from the oscillating disk to said gear.

In witness whereof I have hereunto set my hand this 26th day of January, 1924.

GEORGE E. ROBINSON.

Witnesses:
HARRY WEHLE,
JOHN E. MASON.